Figures 1, 2:
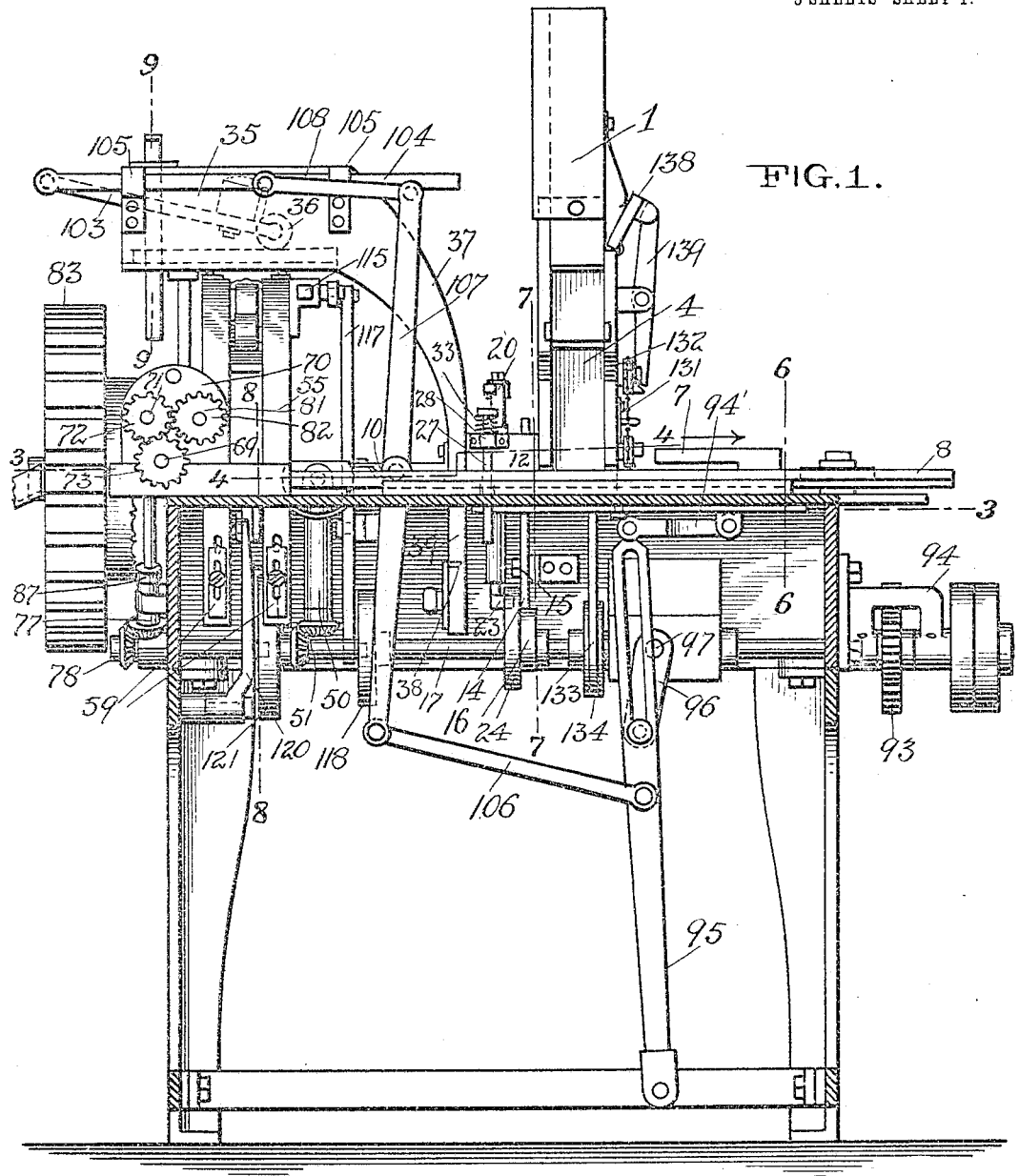

No. 787,100. PATENTED APR. 11, 1905.
Y. LÁZAGA.
MACHINE FOR MAKING UP CIGARETTE PACKAGES.
APPLICATION FILED MAY 22, 1902.

5 SHEETS—SHEET 1.

WITNESSES:
Walter Donaldson
Edw. L. Reed.

INVENTOR
YGNACIO LAZAGA
BY Richards & Co
ATTORNEYS

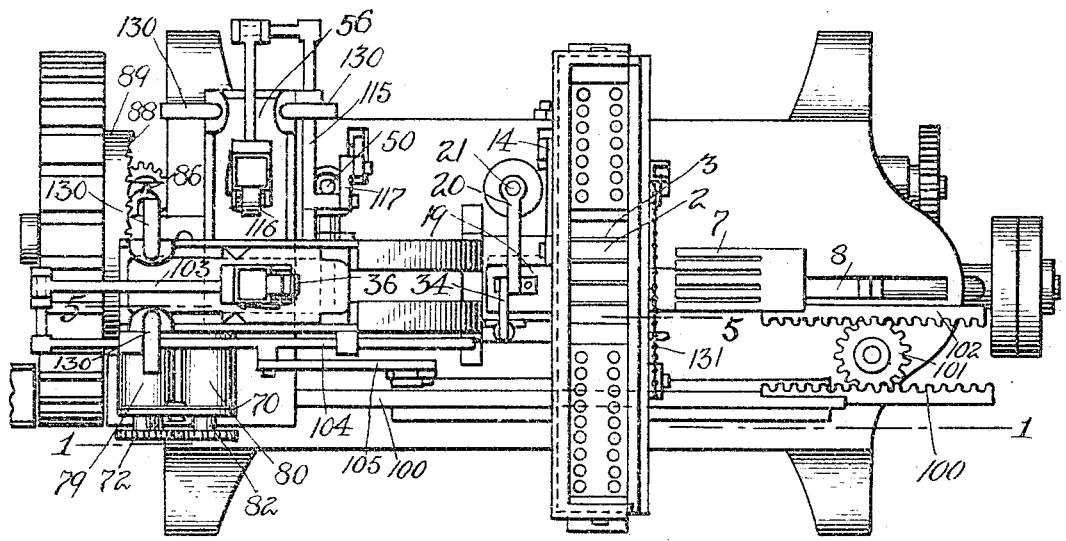
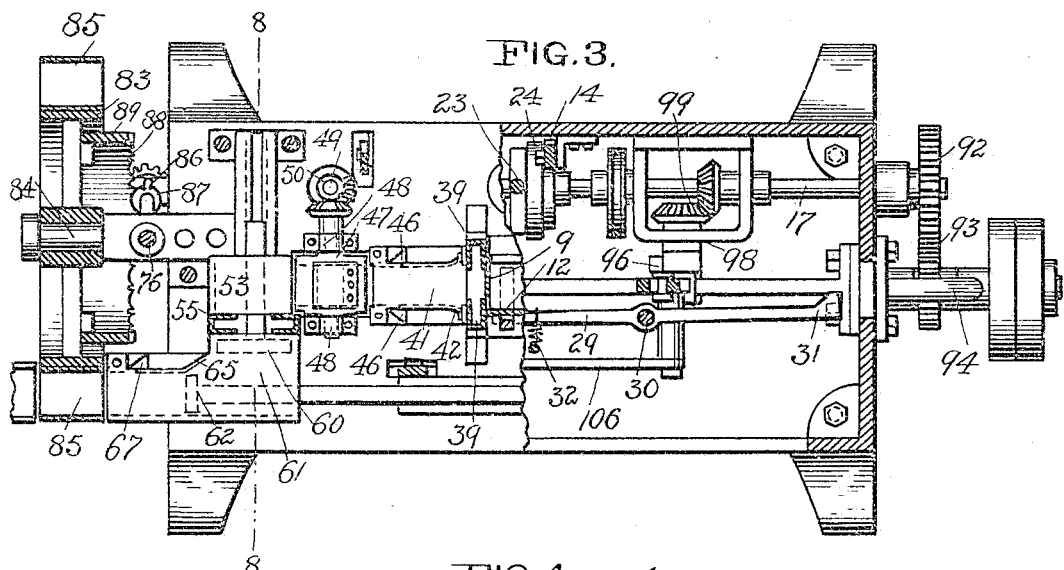

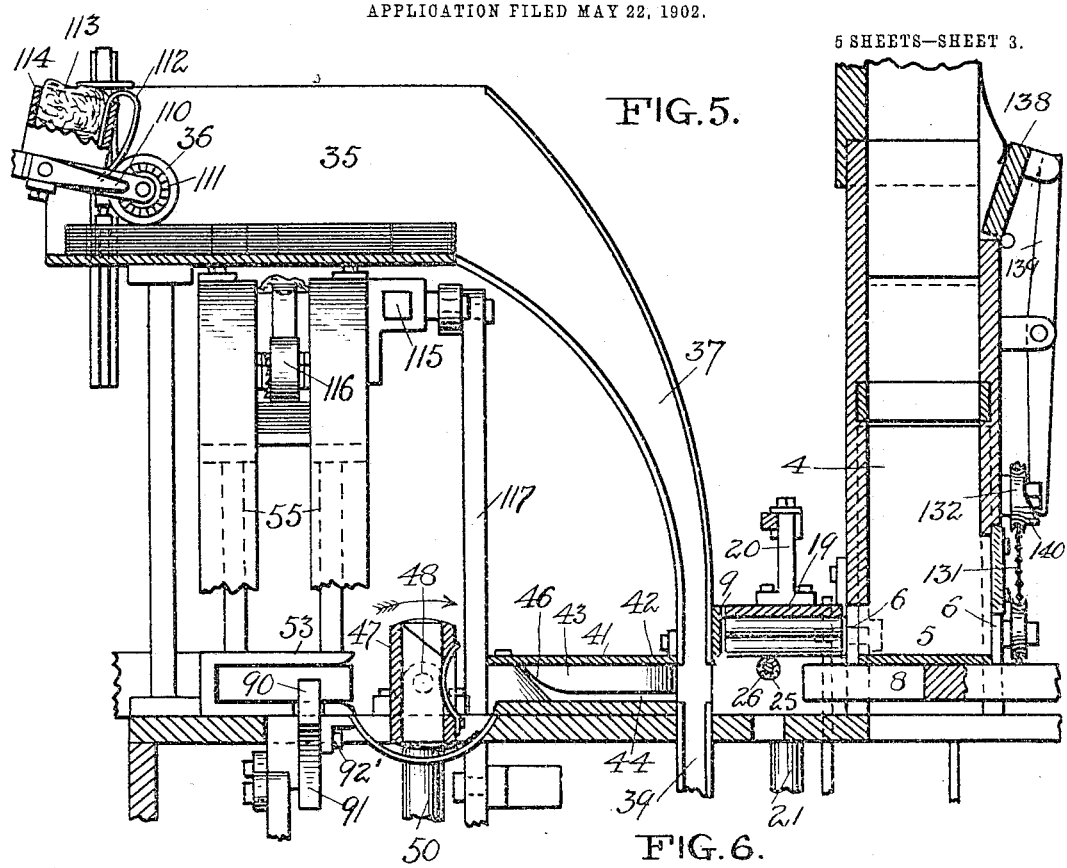

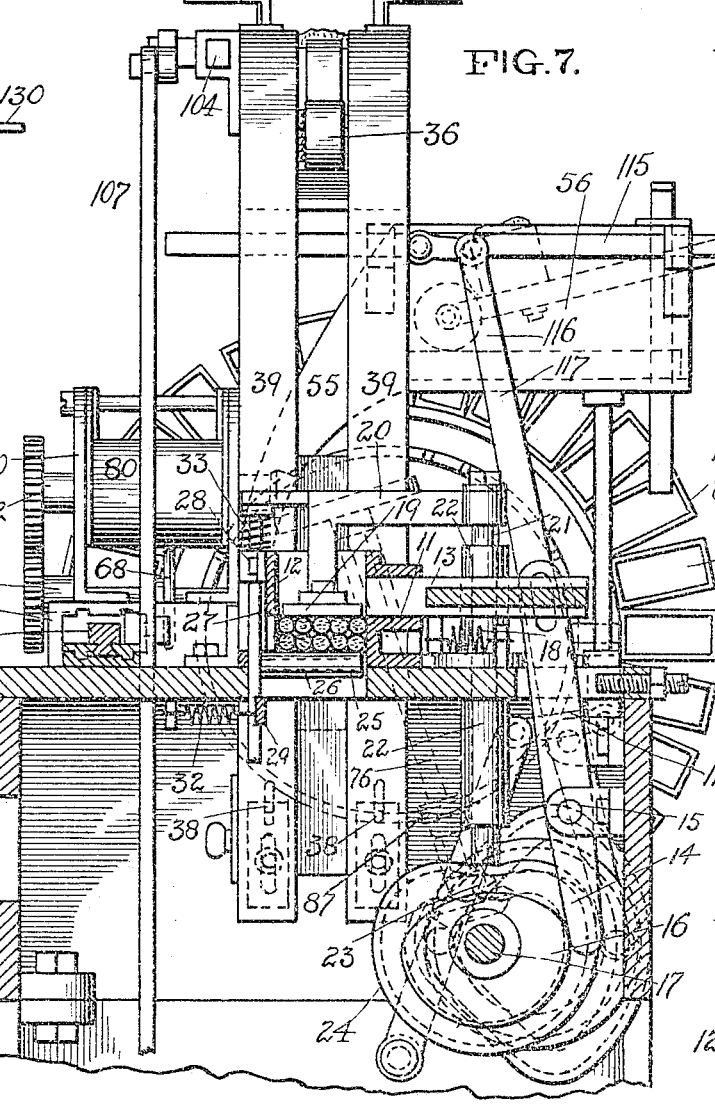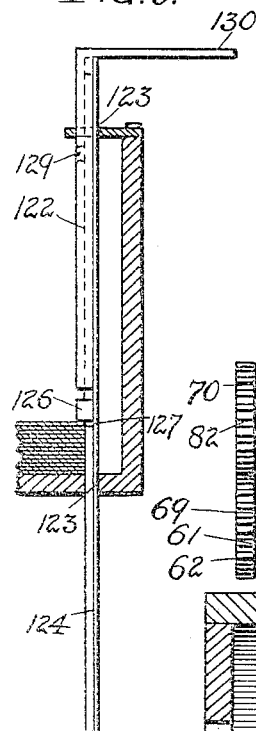

No. 787,100. PATENTED APR. 11, 1905.
Y. LÁZAGA.
MACHINE FOR MAKING UP CIGARETTE PACKAGES.
APPLICATION FILED MAY 22, 1902.
5 SHEETS—SHEET 5.
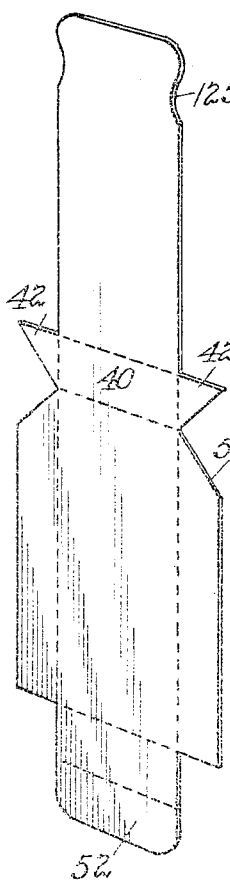
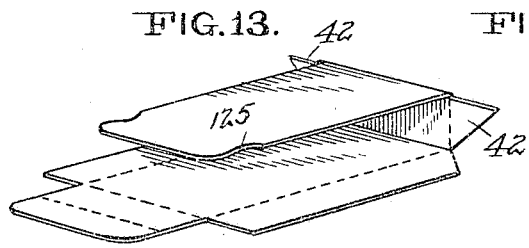
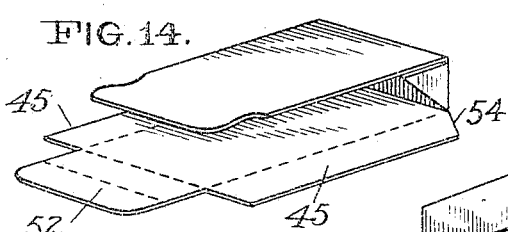
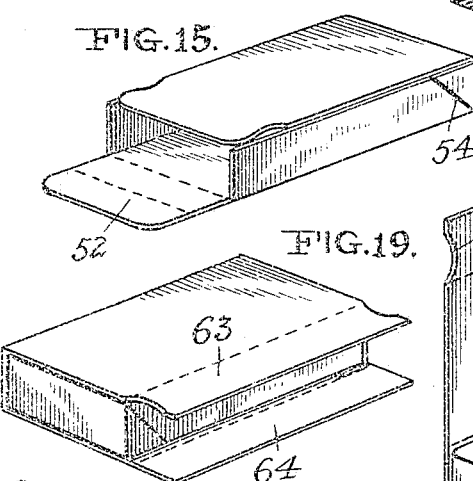
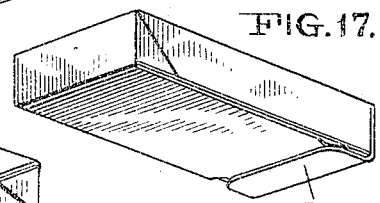
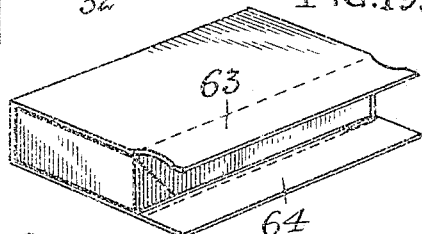
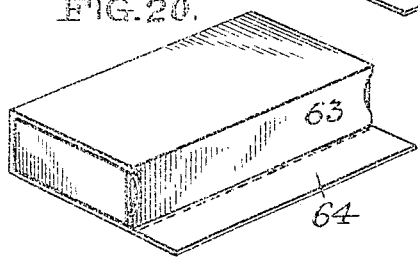
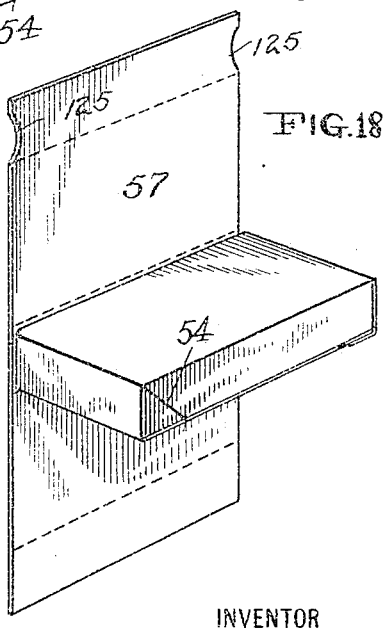
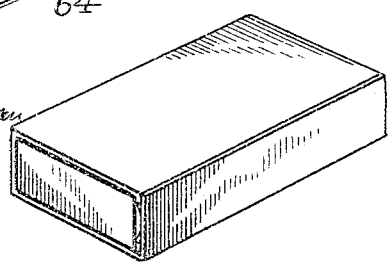
WITNESSES:
Walter Donaldson
Edw. L. Reed
INVENTOR
YGNACIO LAZAGA
BY Richards & Co
ATTORNEYS No. 787,100. Patented April 11, 1905.

UNITED STATES PATENT OFFICE.

YGNACIO LÁZAGA, OF HAVANA, CUBA, ASSIGNOR TO INTERNATIONAL PACKING MACHINE COMPANY, OF NEW YORK, N. Y., A CORPORATION OF NEW YORK.

MACHINE FOR MAKING UP CIGARETTE-PACKAGES.

SPECIFICATION forming part of Letters Patent No. 787,100, dated April 11, 1905.

Application filed May 22, 1902. Serial No. 108,539.

*To all whom it may concern:*

Be it known that I, YGNACIO LÁZAGA, residing at Havana, Cuba, have invented Improvements in Machines for Making Up Cigarette-Packages, of which the following is a specification.

My invention is designed to make up packages of cigarettes by assembling the charge of cigarettes and the blanks necessary to form a complete box or package and then folding the blanks about the cigarettes, so that as discharged from the machine each package or box will be complete and will contain the proper number of cigarettes.

The features of my invention will be described hereinafter, and particularly pointed out in the claims.

In the accompanying drawings, Figure 1 is a side view of a machine embodying my invention, parts being shown in section. Fig. 2 is a plan view of said machine. Fig. 3 is a plan view of a section on lines 3 3 of Fig. 1. Fig. 4 is a similar view on lines 4 4 of Fig. 1. Fig. 5 is a vertical sectional view on line 5 5 of Fig. 2. Fig. 6 is a sectional view on line 6 6 of Fig. 1. Fig. 7 is a vertical transverse sectional view of the machine on line 7 7 of Fig. 1. Fig. 8 is a transverse sectional view on line 8 8 of Figs. 1 and 3. Figs. 9, 10, and 11 are detail views of means for regulating the feed of the blanks, Fig. 9 being a section on line 9 9 of Fig. 1. Fig. 12 represents in perspective the blank from which the inner sliding section of the package or box is made. Figs. 13, 14, 15, 16, and 17 show the said sliding section at different steps in its formation. Fig. 18 is a perspective view showing the manner of assembling the completed slide or inner sliding section and the blank from which the outer casing is formed. Figs. 19, 20, and 21 are perspective views showing the different steps necessary to inclose the slide within the outer case, the latter figure representing the box or package in its complete form. Fig. 22 is a detail perspective view of the folding box for the outer case.

The cigarettes to be packed are placed in large quantities into a hopper or magazine 1, which has a reciprocating movement imparted thereto, as will be hereinafter described, to cause the cigarettes to arrange themselves in converging channels 2, formed by partitions 3, suitably supported in the chute 4, extending downwardly below the hopper or magazine. The lowermost cigarettes in the said channels rest upon a plate 5, extending across the lower end of the chute and supported in fixed relation thereon. Above the plane of this plate openings are left at 6 in the front and rear walls of the chute adapted to permit the passage of feed-fingers 7, attached to a reciprocating plunger 8. There is one of these feed-fingers for each of the channels 2 with which the chute is provided, and at each movement of the plunger 8 leftward, as viewed in Fig. 5, these feed-fingers will pass through the openings 6 and the channels 2 and force out from the latter the two lower rows of cigarettes, it being understood that the end faces of the fingers are of sufficient area for this purpose. This action moves the cigarettes lengthwise in the form of a group or charge off from the plate 5 and into a compressor-box comprising a wall 9, against which the forward ends of the cigarettes may abut lightly. Referring now to Fig. 1, in the position of the parts there shown the forward end of the plunger 8 would be at the point 10, and with this relation existing between the plunger 8 and the feed-fingers 7 carried thereby it will be understood that when the feed-fingers force the cigarettes off from the plate 5 the main part of the plunger will be in position to sustain them. When first fed forward from the channels 2, the cigarettes are not closely packed together, and some of them will be resting on the surface of a platform 11, while the others will rest upon the upper surface of the plunger 8. In order to make the charge of cigarettes compact, the compressor-box, which, as shown in Figs. 1 and 7, has also a side wall 12, coöperates with a laterally-moving plunger 13, operated by a lever 14, pivoted at 15 to the frame and operated from a cam 16 on the shaft 17, suitably journaled in the frame. A spring 18 retracts the plunger. At each forward movement of this compressing-plunger the cigarettes are arranged thereby in a compact charge on the upper surface of the plunger 8. As the latter retracts the cigarettes are held against movement therewith by the edge of the plate 5. It is now necessary to lower the charge of cigarettes from the position shown in Fig. 5 into line with the end face of the plunger, so that as the latter again moves forward it will force the charge from the compressor-box and into the box-forming means to be hereinafter described. In order to effect this lowering of the charge into line with the end face of the plunger 8, I provide a vertically-movable plate 19, overlying the charge of cigarettes and carried by a bracket 20, secured to a rod 21, arranged to move vertically through guides 22, fixed on the frame of the machine. This rod is provided with a roller 23, at its lower end entering a groove of a cam 24. Through this mechanism the plate 19 is lowered to carry down the cigarettes. In order to support the cigarettes from beneath during this lowering operation, I provide a supporting-arm 25, having a roller 26 thereon and extending from a rod 27, arranged to move vertically in suitable bearings, as at 28, on the compressor-box. This rod is normally held in its lowermost position by a catch-lever 29, engaging a notch therein, as shown in Fig. 7. The catch-lever is pivoted to the frame at 30, Fig. 3, to swing horizontally. When now the plunger 8 is approaching the limit of its retracting or rearward stroke, a suitable pin thereon strikes the cam end 31 of the catch-lever 29 and swings it against the tension of its spring 32, so that the bar 27 under the action of its spring 33 will be free to rise, which it does do as soon as the forward end of the plunger 8 is retracted far enough, and in this rising movement the roller 26 will engage the charge of cigarettes and will hold the same in proper position against the plate 19. This plate now descending carries with it the bar 27 and the supporting-roller 26, for which purpose it is provided with an arm 34 to press on the upper end of the rod 27. This lowering movement continues until the charge reaches the position shown in Fig. 7, which is directly in line with the end of the plunger 8, which now moves forwardly. As soon as this takes place the catch-lever 29 reëngages the bar 27 and holds the same, with its supporting-roller, in its lowermost position ready for another action. Just previous to this forward movement of the plunger a blank for forming the slide or inner section of the box has been fed into position across the path of the charge of cigarettes to be struck thereby and forced into the folding means. For this purpose the slide-blanks, Fig. 12, are arranged in a hopper 35, Fig. 5, from which they are fed one by one by means of a roller 36 into a chute 37. When in this chute, the blank rests with its lower edge upon stops 38, adjustably secured to the sides 39, Fig. 3, of the chute. The slide-blank is now vertically disposed with its central portion at 40, Fig. 12, lying directly in the path of the charge of cigarettes, so that as the plunger 8 forces said charge forwardly the slide-blank will be forced into the folding means consisting of a box 41, Figs. 3 and 5, having a flaring mouth at 42. The first effect is to bend the slide-blank into the form shown in Fig. 13. The triangular shoulders or flaps 42 are next bent inwardly to the position shown in Fig. 14, and this is due to the flared form of the mouth of the box, the said flaps contacting with the inner side of said flared walls at 42. The side walls 43 of the folder are slightly raised from the bottom of the folder, as at 44, Fig. 5, for the passage of the side flaps 45 of the slide-blank, which lie flat, as shown in Fig. 14, until they reach inclines 46, by which they are turned up into the position shown in Fig. 15. The slide is now pushed out from the folding-box by the next incoming slide-blank and charge, and it passes into a box 47, having journals mounted in bearings 48 on the frame. This box is open at both ends, and it is rotated intermittingly by mutilated gearing 49 from the shaft 17 through a vertical shaft 50 and bevel-gearing 51. Each time the said box 47 receives a slide with its contained cigarettes it makes a one-half turn in the arrow direction, Fig. 5, and in this movement the rearwardly-projecting end flap 52 will be given a quarter-turn, as shown in Fig. 16, in which position it will lie up against the end of the slide. The half-turn of the box 47 having been completed, the slide now lies in line with a shell or casing 53, having a slightly-flaring mouth, Fig. 5, so that when the slide-section of the package is forced into this casing the end flap will be completely folded upon said slide-section, as represented in Fig. 17. It will be noticed from the foregoing description that the charge of cigarettes is now completely inclosed within the slide-section of the box or package, and no paste has been necessary up to this point to complete the closure. The side flaps 45 of the slide-section are of sufficient height to reach from the bottom to the top of the slide-section, and they have inclined edges at 54, Figs. 12 to 18, to match the inclined edges of the triangular flaps 42.

Referring again to the casing 53, it will be seen from Fig. 8 that this is open on both sides. A chute 55 leads down, as shown in Figs. 1, 3, 5, and 8, from a hopper 56, containing the blanks 57, Fig. 18, for forming the outer case of the box of the shape and dimensions illustrated in Fig. 21. These blanks are positioned one by one opposite the side of the slide-section of the box when the same is in the casing 53, as represented in Fig. 8, being held in this position by adjustable stops 59, similar to those before described for determining the position of the slide-blanks. The relative positions of the slide-section and the outer-case blank are represented in Figs. 8 and 18, and when the slide-section is moved laterally by means of a plunger 60 the blank 57 will be thrust into a folder 61, thereby being bent laterally onto the slide-section in the form shown in Fig. 19, and in this position of the parts the slide-section is in direct line with a plunger 62, moving longitudinally of the machine, which now takes the slide-section, with its partially-folded outer case, and forces the same forwardly through the folder box or casing 61, which results, first, in folding down the upper side flap 63 of the outer case from the position shown in Fig. 19 to that shown in Fig. 20, and this is followed by the folding upwardly of the flap 64 from the position of Fig. 20 onto the outer side of the flap 63, as in Fig. 21. These folding operations take place in succession, the first being due to the edge 65 of the depending side wall 66 of the box, which edge inclines downwardly and inwardly, and the second folding action—*i. e.*, that of the flap 64—resulting from said flap riding up the incline 67, Figs. 3 and 22. This completes the folding actions, and the package is now in the form shown in Fig. 21, the end flap 52 being held tucked in by the outer case. Just previous to the second folding action above described, by which the lower flap 64 of the outer case is folded up against the side of the package, paste is supplied to the upper face of this flap, for which purpose a paste-applying roller 68 is arranged at one side of the folding box or case 61, with its lower edge in the path of the upper surface of the flap 64, so that as the flap passes by it receives a supply of paste and on being folded or bent upwardly against the flap 63 causes the uniting of these flaps. The paste-roller is on a shaft 69, journaled in the walls of a paste-box 70, Figs. 1 and 7. It is driven from a shaft 71, also journaled in the walls of said box, through gearing 72 73. The shaft 71 is in turn driven through gearing 74 75, Fig. 8, an inclined shaft 76, Figs. 1 and 8, and beveled gearing 77 78 from the shaft 17. The shaft 71 carries a roller 79, and adjacent to this is a similar roller 80 on a shaft 81, also journaled in the walls of the paste-box, said shaft, with its roller, being rotated through the gear 82 from the gear 72. In the bight or pocket formed by these two rollers the paste is placed, and this is taken off from the roller 79 and supplied to the flap 64 of the outer case by the roller 68, as before mentioned.

At the forward end of the machine a carrier-wheel 83 is arranged to turn in a direction transversely of the machine on a pin 84, projecting from the frame. This carrier-wheel is provided with a series of pockets 85 of rectangular form adapted to receive the completed package from the folding and pasting mechanism just described. The carrier is rotated step by step from the shaft 76 through a pawl 86, Figs. 2 and 3, on a collar 87, fixed on the shaft, said pawl at each revolution engaging one of the notches 88 in the rim 89, fixed to the carrier-wheel. At each step the carrier presents one of its pockets opposite the discharge end of the folding-box 61, so that when the package therein is forced out of said box by action of the plunger 62, forcing a fresh package to the folding means, the package forced out will enter the pocket in the carrier-wheel and will be retained therein during the entire revolution of the carrier-wheel and will be finally discharged by the incoming package. The package is thus confined in the carrier-wheel a sufficient length of time to allow it to set and to allow the drying of the paste to a sufficient degree to insure the firm sealing of the outer case. I do not limit myself to the width of the carrier shown, as this may be made twice as wide, so that the package will remain therein during two revolutions, being moved half-way across at the completion of the first revolution and being discharged at the end of the second revolution.

In Fig. 8 I show at 90 a presser device consisting of a finger carried by a weighted arm 91, pivoted at 92' to the bottom of the casing 53. This finger normally stands upright, and it serves to maintain the shape of the slide or inner section of the box and of the charge when the said inner section is in the open-sided casing 53 and while it is being forced therefrom into the folding box or casing 61. This presser-finger yields to allow the slide-section to pass over it when moved by the plunger 60.

Referring now to the detail mechanism for driving the various parts, the cam-shaft 17 is driven through gearing 92 93 from a short shaft journaled in the bracket 94, fixed to the main frame. The main plunger 8 is reciprocated through a link 94', pivotally connected thereto and to a lever 95, pivoted to the frame, said lever being operated by a crank-arm 96 on a shaft 97, suitably journaled at 98, Fig. 3, and rotated through gearing 99 from the shaft 17. The supplemental plunger 62 is reciprocated by having its stem provided with a rack at 100, which meshes with a gear 101, journaled on the top of the main frame, Fig. 2, and oscillated by the rack-bar 102, connected with the main plunger. The feed-roller 36 for the slide-blanks is carried by an arm 103, pivoted to a bar 104, slidably supported in guides 105 on the hopper. The slide-bar is operated from the lever 95 through a link 106, a lever 107, pivoted to the frame, and a link 108. The roller is free to rotate in the return stroke of the slide-bar; but on its working stroke it is held against turning by a pawl and ratchet 110 111, Fig. 5. Moisture is supplied to the roller by a wick 112 from a sponge 113 in a cup 114, carried on the arm 103. A similar feed mechanism is used for the outer-case blanks, Fig. 7, the roller being marked 116, the slide-bar 115, and the operating-lever 117, the latter being operated from a cam 118. The plunger 60 is operated by a link 119, Figs. 5, 7, and 8, a lever 120, and a cam 121 on the shaft 17.

Figs. 9, 10, and 11 show means for regulating the feed of the blanks, so that only the top one of the pile will be fed when the roller is on its working stroke. This consists of a bar 122, adapted to move down by gravity through guides 123 and having a rib 124, provided with a rounded face to engage the notches 125 in the side edge of the blanks, Figs. 12 and 18. The bar is provided with a shoulder 126, which rests on the top of the pile, and there is a crevice 127 between the lower side of this shoulder and the upper end of the rib 124 just wide enough to permit the passage through it of the topmost blank, all the others being held by the said rib. When the topmost blank is fed through these crevices, it being understood that there is one of these bars on each side of the hopper, both bars drop until their shoulders 126 rest upon the next blank, which is now the topmost one, and the crevices 127 are now presented to the edges of this blank, so that it may be fed. The bars are extensible, each having a casing 128 adjustably secured to the main part by a screw 129 and having also a laterally-projecting handle 130.

I provide a cleaning-chain 131, Fig. 6, adapted to clean out the space under the feed-fingers 7. This chain passes over pulleys 132, one of which is driven from the shaft 17 through the belt 133 and pulleys 134. One of these pulleys has a crank-pin 135, connected by a link 136 with the hopper to impart a lateral shake thereto for the proper feed of the cigarettes. The hopper is guided in a way 137. The front wall of the hopper is provided with a pivoted section 138, which is rocked by a lever 139, operated by a cam 140 on the pulley 132. By this rocking wall the cigarettes are agitated and properly positioned.

I do not limit myself to the use of my machine for making up packages of cigarettes, as other commodities may be similarly packed.

I claim as my invention—

1. In combination, a folder-box, means for registering a blank in front of the folder-box so that its central portion 40 for forming the closed end of the inner slide-section will lie in front of the folder-box, a plunger means for feeding the cigarettes between the plunger and the blank with the cigarettes disposed with their longitudinal axes at right angles to the surface of the central portion 40 of the blank, inclines on the folder-box for folding up the sides of the inner slide-section, a casing 53 for receiving the inner sliding section, a plunger operating in the said casing at right angles to the longitudinal axes of the cigarettes lying in the slide-section, means for registering an outer-case blank opposite the lateral side of the slide-section, a second folder-box for receiving the said slide-section with the outer-case blank and a plunger to force the said parts through the said folder-box, said folder-box having inclines for folding the sides of the outer-case blank, substantially as described.

2. In combination two plungers operating at right angles to each other, a folder-box in which one plunger operates longitudinally, means for holding a blank between the box and the other plunger, means for moving one of the plungers to force a blank into the box laterally, to form the preliminary fold and inclines on the box engaging the blank as it passes longitudinally therethrough, to form the final folds, substantially as described.

3. In combination a plunger for forcing a charge of cigarettes or the like against a slide-blank, means for receiving the same and folding the blank onto the charge, a rotary box for receiving the blank with its charge from the folding means a casing for receiving the folded blank and its contained charge from the rotary box a plunger arranged to move the slide-section laterally means for feeding an outer-case blank across the path of the slide-section, means for folding said blank down onto the slide-section, a plunger for moving the slide-section longitudinally with its partially-folded blank and means for completing the folding of the outer-case blank substantially as described.

4. In combination means for folding a blank about a charge of cigarettes a casing into which the folded blank with its charge is received, a plunger for forcing the slide-section from the casing a yielding presser arranged across the path of the slide-section, means for holding an outer-case blank across the said path and means for folding the outer-case blank about the slide-section substantially as described.

5. In combination a plunger and a box for folding a blank when the same is forced therein, said box having at its mouth inclines 42 for folding in the triangular flaps of the blank and inclines 46 for folding the side flaps and means for folding an outer-case blank about the section first folded substantially as described.

6. In combination folding means a main plunger, a supplemental plunger a connection between them whereby they move in opposite directions and a plunger operating transversely of the main and supplemental plungers to transfer the package from the line of one plunger into line with the other plunger said connection between the main and supplemental plungers comprising the pinion 101 and the racks 100 and 102.

7. In combination, a folder-box, a plunger coöperating therewith for forming an inner slide-section by folding a blank loosely, a second folder-box having fixed inclines and a wall 66 for folding and holding separated the side flaps of the outer case and pasting means interposed between the fixed inclines of the second folder-box, substantially as described.

In testimony whereof I have hereunto set my hand in presence of two witnesses.

YGNACIO LÁZAGA.

Witnesses:
   JOSEPH A. SPRINGER,
   PIKARDO BRALO.